A. P. LEE.
SEMITRAILER.
APPLICATION FILED NOV. 6, 1919.
1,385,177.
Patented July 19, 1921.
3 SHEETS—SHEET 1.
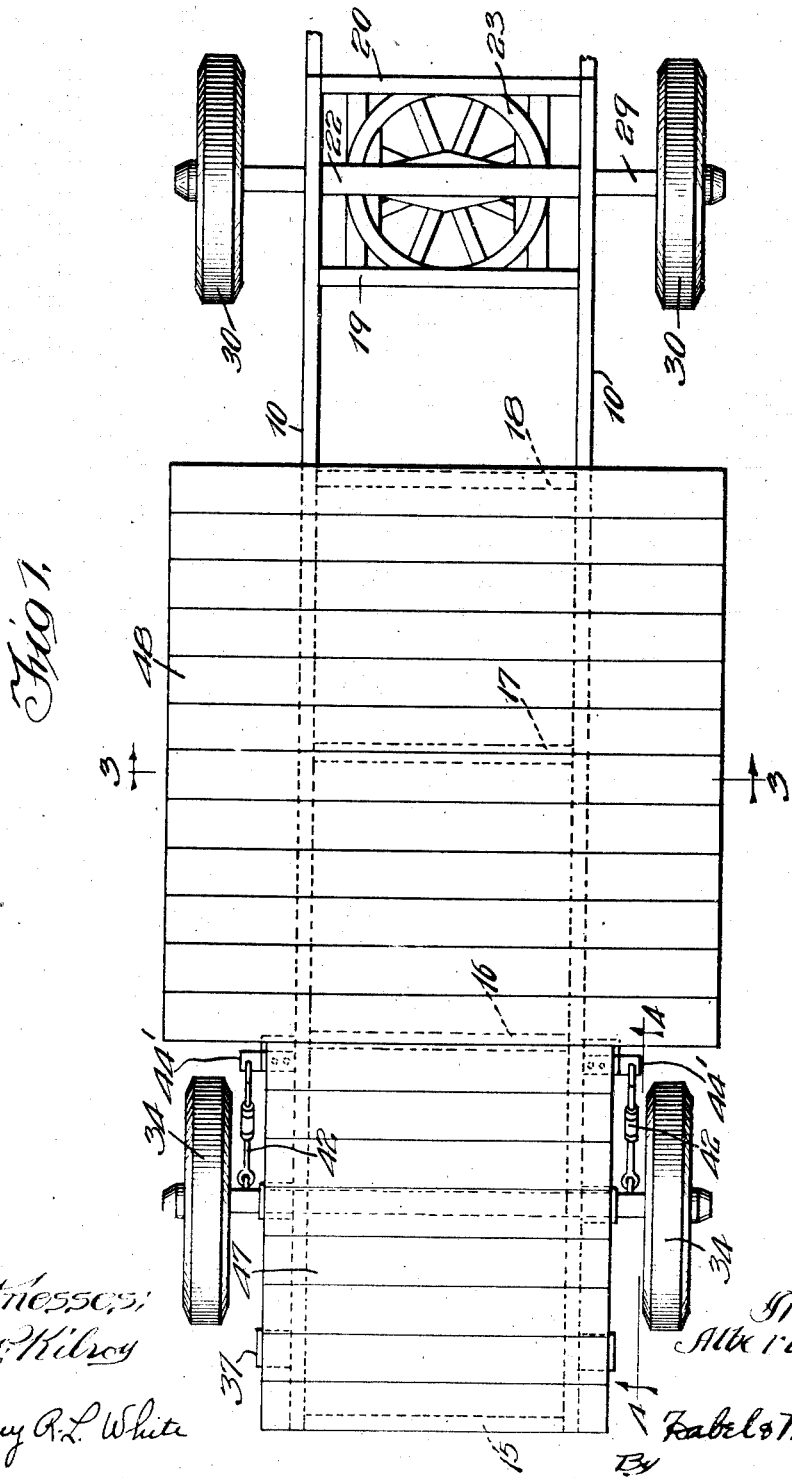

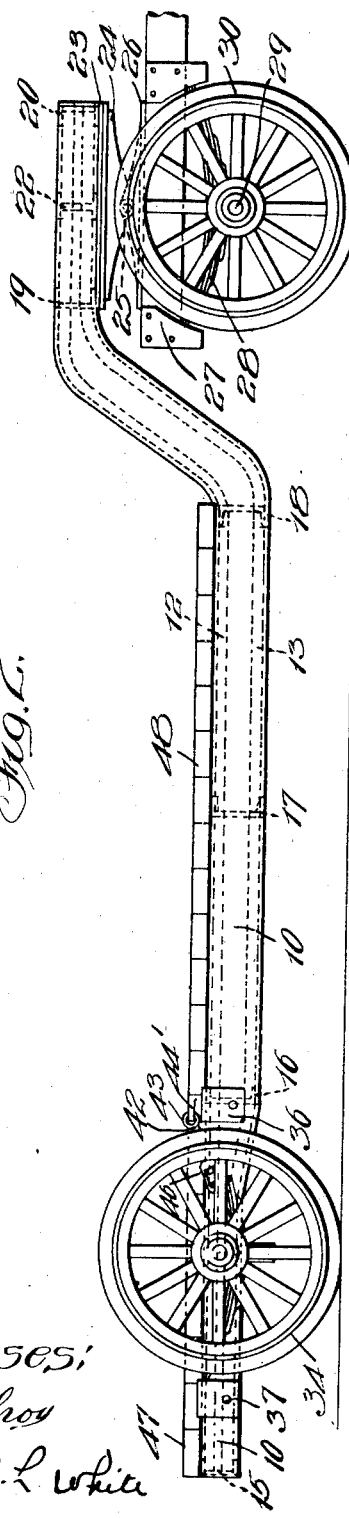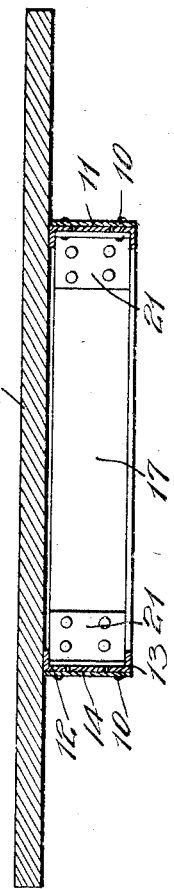

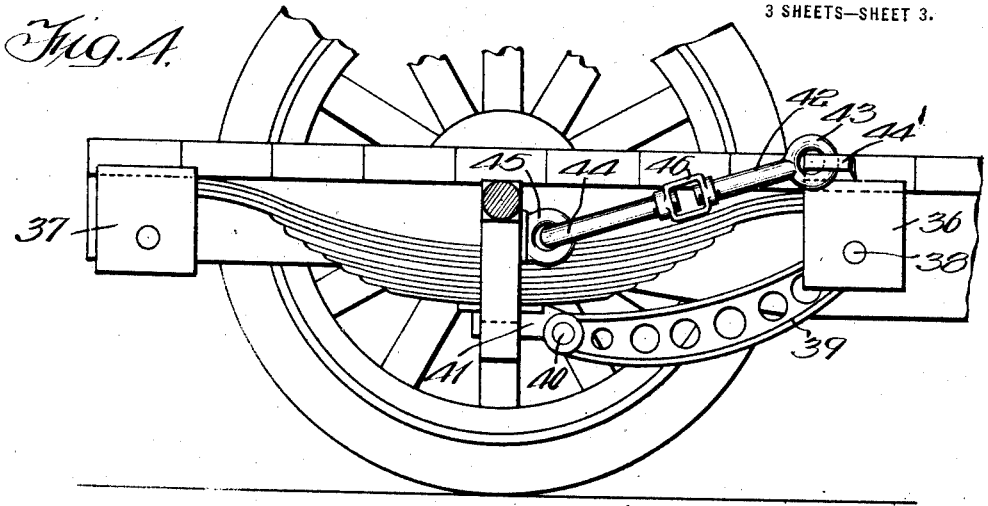
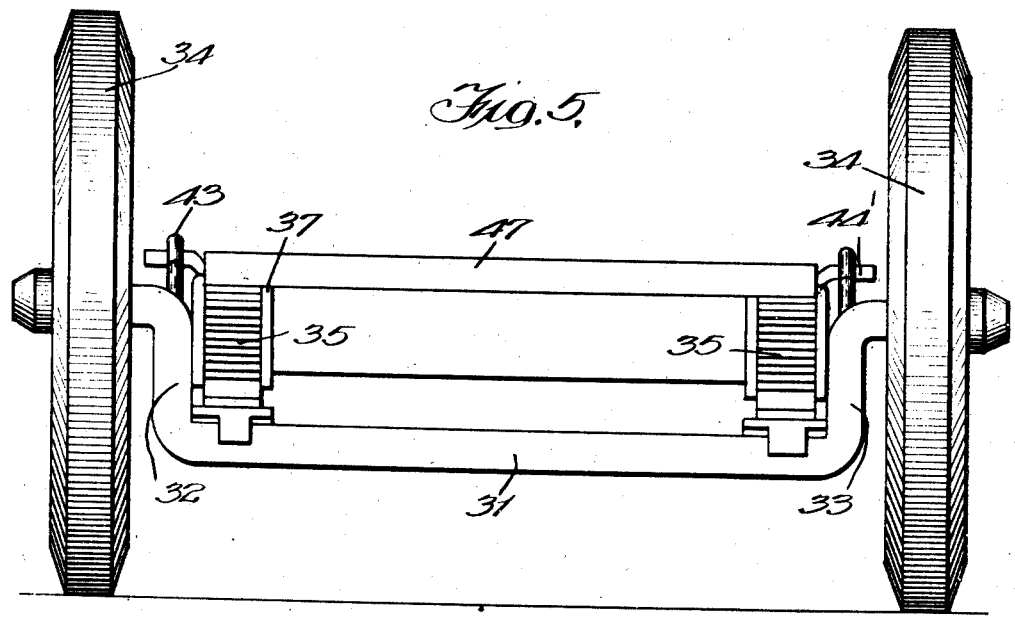

UNITED STATES PATENT OFFICE.

ALBERT P. LEE, OF CHICAGO, ILLINOIS, ASSIGNOR TO LEE TRAILER & BODY CO., OF CHICAGO, ILLINOIS.

SEMITRAILER.

1,385,177.  Specification of Letters Patent.  Patented July 19, 1921.

Application filed November 6, 1919. Serial No. 336,043.

*To all whom it may concern:*

Be it known that I, ALBERT P. LEE, a citizen of the United States, residing at Chicago, in the county of Cook and State of Illinois, have invented a certain new and useful Improvement in Semitrailers, of which the following is a full, clear, concise, and exact description, reference being had to the accompanying drawings forming a part of this specification.

My invention relates to semi-trailers and more particularly to a semi-trailer having a drop frame. In order to provide a drop frame which is close to the ground throughout most of its length it is necessary to provide a drop axle to support the rear or low end of the frame. It is therefore an object of my invention to provide a trailer so constructed that the top of the trailer shall be elevated only a sight distance above the surface of the ground.

It is a further object of the invention to provide a drop frame semi-trailer which has at its forward end means whereby it may be detachably secured to the rear end of an ordinary truck structure or may be detachably secured to the rear end of any drawing vehicle.

It is a further object of my invention to provide a drop frame trailer which has a flat platform of substantial area which is adapted to accommodate articles of large size and upon which said articles may be positioned without raising them far off the ground.

With these and other objects in view which will be apparent from the detailed description of the device disclosed in the drawings I have shown one form which my invention may take. However, it is to be understood that by this specification and the accompanying drawings I do not intend to limit myself to the specific construction disclosed as modifications in the specific structure may be required in the manufacture thereof or may occur to those skilled in this art. The real nature and scope of the invention disclosed is to be determined from the claims appended to this specification. The same reference characters have been used to designate the same parts throughout the several views of the drawings in which—

Figure 1 is a plan view of my improved semi-trailer;

Fig. 2 is a side elevation of the trailer;

Fig. 3 is a transverse section taken on line 3—3 of Fig. 1;

Fig. 4 is a vertical section taken approximately on line 4—4 of Fig. 1;

Fig. 5 is a rear elevation of the rear axle and its supporting wheels.

In the drawings the reference numeral 10 designates the side members of the trailer framework. These side members are formed as shown in Fig. 2 and each comprises a plate 11 cut to the desired shape. In order to reinforce this plate to provide rigid side members upper angles 12 and lower angles 13 are riveted along the edges of the plate on the inside of the plate. The space between the vertical legs of the angles 12 and 13 is filled by means of plates 14 at the points where the cross members are to be secured.

These side members are rigidly connected by means of a plurality of channel shaped cross members 15, 16, 17, 18, 19 and 20. These cross members are secured to the side members by means of short sections of angles 21 as shown in Fig. 3 of the drawings. The angles 21 are riveted to the webs of the channel shaped cross members and are also riveted to the side members 10 at the points where the plates 14 fill the space between the angles 12 and 13. Between the cross members 19 and 20 is an I-beam 22 which extends from side to side of the framework and is rigidly secured to the side members 10 substantially as the cross members are secured thereto. It is preferred, however, to have angles 21 on both sides of the I-beam 22 in order to more securely support the I-beam. The construction just described provides a substantial and rigid trailer framework which is supported in a manner to be described later.

Suitably secured to the under side of the cross members 19 and 20 and the I-beam 22 is the upper element of a turntable 23. This element coöperates with the correspondingly formed turntable element 24 which is pivotally connected at 25 to a supporting member 26 which is adapted to be detachably secured to a truck structure 27 supported on springs 28 which are in turn secured to the axle 29 having the usual wheels 30. The truck structure 27 may be either the rear end of a drawing vehicle or may be a detachable front wheel structure such as is disclosed in my copending application Serial No. 293,202, filed April 28, 1919. In order that the rear or drop end of the trailer framework may lie close to the ground I provide low supporting means therefor which are constructed in the following manner: The rear axle 31 has a depressed central portion as shown in Fig. 5 and has vertical extending portions 32 and 33 carrying at their upper ends the spindles to which the wheels 34 are connected in the usual manner. Resting upon the depressed portion of the axle and suitably secured to the axle are the rear springs 35 which preferably extend longitudinally of the framework just outside of the frame members 10. Riveted to the side frame members 10 are spring brackets 36 and 37, the brackets 36 accommodating the front ends of the springs 35 and the brackets 37 being positioned near the rear end of the frame members 10. The front spring brackets support pivot pins 38 to which are pivotally secured the front ends of radius rods 39. These rods are pivoted at 40 to brackets 41 suitably secured to the rear axle 31 as shown in Fig. 4. In order to further strengthen the rear axle and to prevent swinging of the same relatively to the framework I provide auxiliary radius rods 42. These rods have eyelets 43 formed at their forward ends which eyelets engage fingers 44' riveted or otherwise suitably secured to the tops of the front spring brackets 36. The rear ends of the auxiliary radius rods are provided with eyelets 44 which engage other eyelets 45 rigidly secured to the vertical portions 32 and 33 of the rear axle. With this construction it will be apparent that the radius rods 39 maintain the lower portion of the rear axle 31 in definite relation to the framework and that the auxiliary radius rods 42 maintain the upper portion of the axle and the wheels in the same definite relation. The auxiliary radius rods are provided with turn buckles 46 so that they may be adjusted to aline the axle with the framework.

The rear portion of the framework which is between the wheels 34 supports a narrow portion 47 of the platform. Forwardly of the rear wheels the platform is widened as shown at 48 in Fig. 1 in order to increase the supporting area of the platform. This widened portion 48 of the platform extends forwardly and covers the remaining part of the drop portion of the framework. With the rear axle depressed or bent downwardly as shown in Fig. 5 and with the rear portion of the framework depressed as shown in Fig. 2 it will be apparent that I have provided a platform trailer which has a platform of substantial area positioned only a short distance above the ground. The turn table at the forward end of the trailer is adapted as pointed out above to be detachably secured to the rear end of any drawing vehicle or truck or may be placed upon a front wheel truck structure of ordinary construction. When thus arranged the device may be used as a trailer instead of a semi-trailer.

From what has been described the construction and operation and the nature of my invention will be apparent to those skilled in the art.

Having thus described my invention what I claim as new and desire to secure by United States Letters Patent is:

1. A channeled side member for a drop frame trailer framework, having an offset portion, said side member being built up of a plate having offsets to provide the offset in the side member, angles having offsets alining with the offset of said plate riveted to the plate adjacent the upper and lower edges thereof, and a filler plate provided with an offset mounted between the opposite edges of the angles.

2. A semitrailer comprising a framework having a raised portion adapted to be supported upon the framework of a pulling vehicle, and a depressed rear portion, said depressed rear portion being supported by an axle having a depressed portion, and means for preventing swinging of said axle relatively to the framework, said means comprising radius rods connecting the lower portion of the axle to the framework and adjustable radius rods connecting the upper portion of said axle to said framework, said radius rods being disposed in pairs at opposite sides of said framework.

In witness whereof, I hereunto subscribe my name this 4th day of November, A. D. 1919.

ALBERT P. LEE.